US012722481B2

(12) United States Patent
Fremaux

(10) Patent No.: US 12,722,481 B2
(45) Date of Patent: Sep. 1, 2026

(54) METHOD OF DEACTIVATING A CUT-OFF FUNCTION OF AN ENGINE OF AN ENGINE-DRIVEN TWO-WHEELED VEHICLE

(71) Applicant: Schaeffler Technologies AG & Co. KG, Herzogenaurach (DE)

(72) Inventor: Jean-Luc Fremaux, Toulouse (FR)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 19/268,271

(22) Filed: Jul. 14, 2025

(65) Prior Publication Data

US 2026/0054566 A1 Feb. 26, 2026

(51) Int. Cl.

*B60K 28/04* (2006.01)
*B60K 28/14* (2006.01)
*B62J 45/412* (2020.01)
*B62J 45/415* (2020.01)

(52) U.S. Cl.

CPC ............. *B60K 28/14* (2013.01); *B62J 45/412* (2020.02); *B62J 45/4151* (2020.02); *B60Y 2200/12* (2013.01)

(58) Field of Classification Search

CPC ....... B60K 28/14; B62J 45/412; B62J 45/415; B62J 45/4151; B60W 2050/021; B60W 2050/0215; B60W 50/0205; B60W 50/02; B60W 2300/36; B60W 2520/18; B60W 2710/06; B60Y 2200/12

USPC ............... 180/271, 282, 283, 284, 285, 219; 200/61.45, 61.52; 701/112; 340/440

See application file for complete search history.

(56) References Cited

U.S. PATENT DOCUMENTS 7,011,177 B2 * 3/2006 Machida ............... F02N 11/101 340/440
7,124,852 B2 10/2006 Hasegawa
8,170,753 B2 5/2012 Kawamura et al.

(Continued)

FOREIGN PATENT DOCUMENTS

CN 105818804 A * 8/2016 .......... B60W 40/107
DE 102010039830 B4 5/2015

(Continued)

*Primary Examiner* — Keith J Frisby

(74) *Attorney, Agent, or Firm* — NIXON & VANDERHYE

(57) ABSTRACT

The invention relates to a method of deactivating a cut-off function of an engine (10) of an engine-driven two-wheeled vehicle (1), said vehicle (1) comprising an electronic control unit (11) comprising an inclination sensor (111) configured to measure the lateral inclination angle (θ) of the vehicle (1) and to compare the calculated inclination angle (θ) with the second inclination threshold (θ2) and send a signal to stop the engine (10) if the calculated inclination angle (θ) is greater than the second inclination threshold (θ1), said method comprising the steps of:

activating (E1) the electronic control unit (11) by an action of a user, receiving (E2) the speed of the vehicle (1), if the received speed is zero, calculating (E4) the inclination angle (θ) of the vehicle (1), if the calculated inclination angle (θ) is greater than the first inclination threshold (θ1), the electronic control unit (11) deactivates (E8) the cut-off function of the engine (10**).

10 Claims, 3 Drawing Sheets

(56) References Cited

U.S. PATENT DOCUMENTS

| | | | | |
|---|---|---|---|---|
| 8,352,122 | B2 * | 1/2013 | Hasegawa | B62K 25/04 280/755 |
| 8,919,197 | B2 | 12/2014 | Sakamoto et al. | |
| 10,689,045 | B2 | 6/2020 | Saito | |
| 2002/0027037 | A1 * | 3/2002 | Yamamoto | B62J 45/42 180/219 |
| 2004/0256170 | A1 * | 12/2004 | Gaudiano | B62J 27/00 180/282 |
| 2006/0020385 | A1 | 1/2006 | Kakinuma | |
| 2009/0265058 | A1 * | 10/2009 | Hasegawa | F02D 29/02 701/99 |
| 2010/0235075 | A1 * | 9/2010 | Ishikawa | F02D 17/04 701/112 |
| 2019/0176622 | A1 * | 6/2019 | Suzuki | B60K 28/14 |
| 2019/0339073 | A1 * | 11/2019 | Saito | G01C 9/06 |

FOREIGN PATENT DOCUMENTS

| | | | | | |
|---|---|---|---|---|---|
| EP | 3031707 | A2 | | 6/2016 | |
| ES | 2240293 | T3 | * | 10/2005 | B60R 21/0132 |
| JP | 2010084570 | A | * | 4/2010 | |
| JP | 2010121672 | A | | 6/2010 | |

* cited by examiner

[Fig 1]
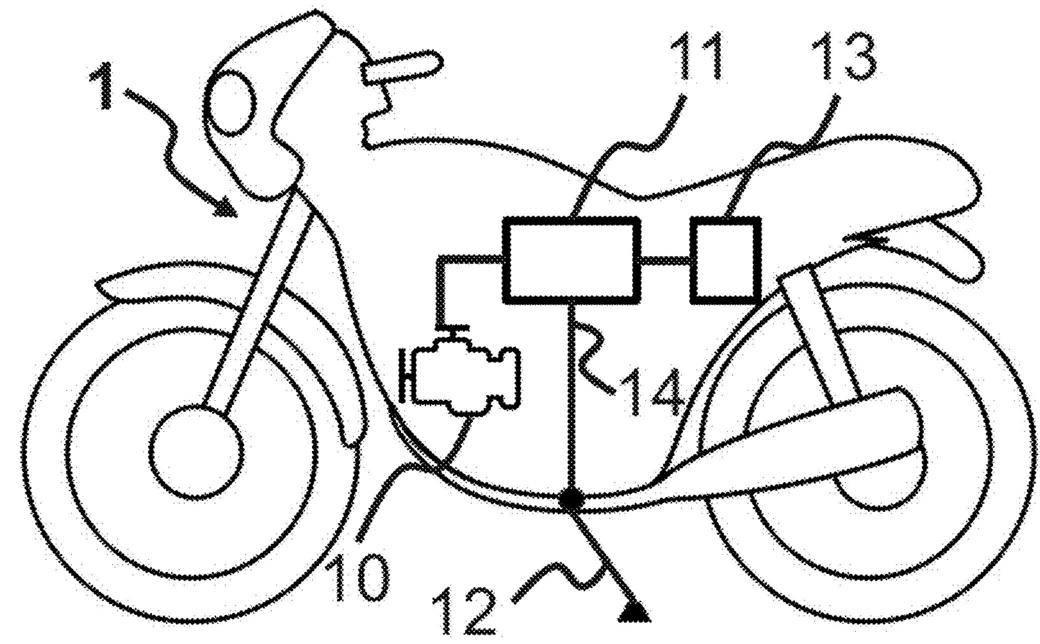
[Fig 2]
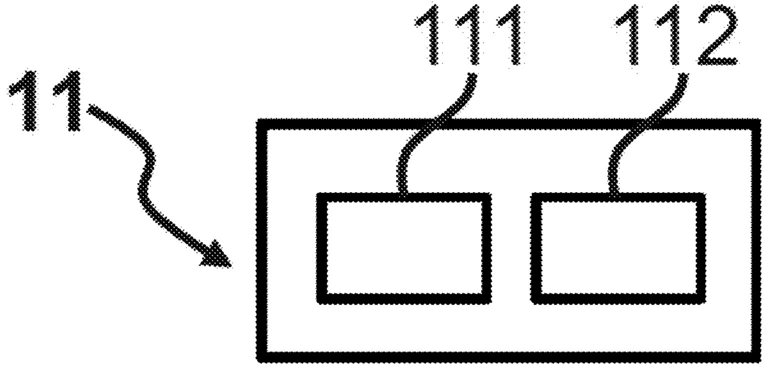

[Fig 3]
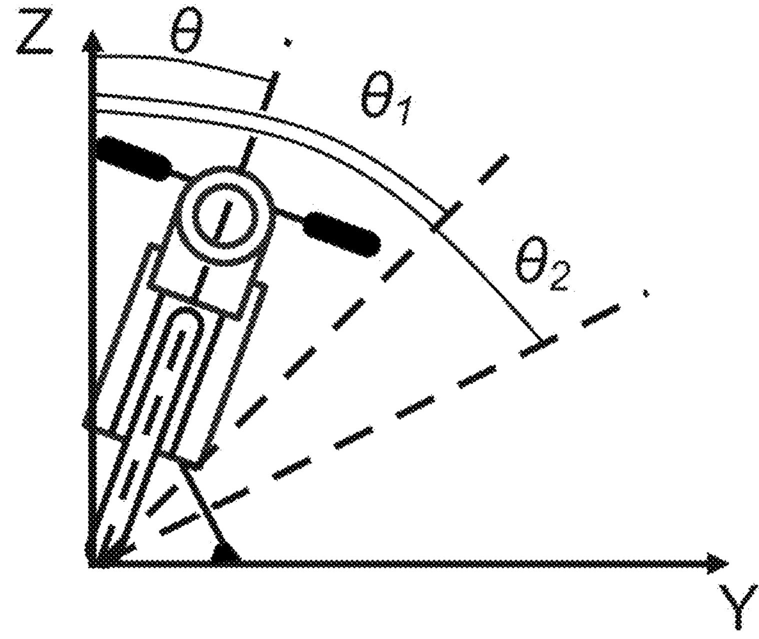

[Fig 4]
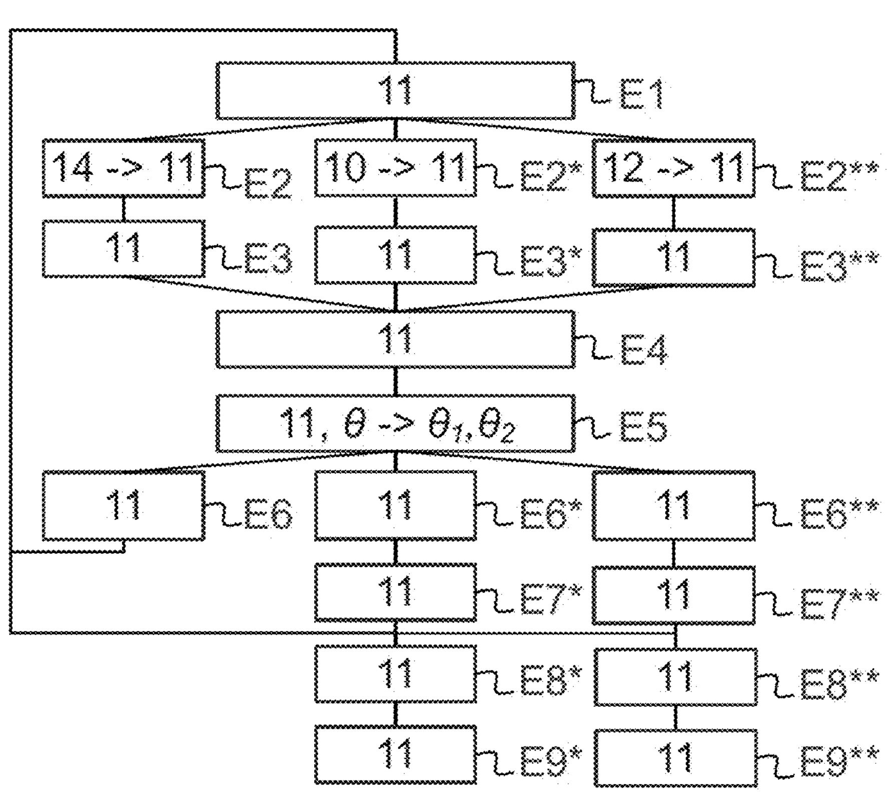

METHOD OF DEACTIVATING A CUT-OFF FUNCTION OF AN ENGINE OF AN ENGINE-DRIVEN TWO-WHEELED VEHICLE

This application claims priority to FR Patent Application No. 2408972 filed Aug. 20, 2024, the entire contents of which are hereby incorporated by reference.

TECHNICAL FIELD

The present invention relates to the field of engine-driven two-wheeled vehicles and more particularly relates to a command for cutting off an engine on the basis of the lateral inclination of the vehicle.

PRIOR ART

In order to improve driver safety, many engine-driven two-wheeled vehicles are currently equipped with systems which may act directly on the operation of the vehicle, without the intervention of the driver, as soon as a critical situation is detected.

In a known manner, manufacturers of engine-driven two-wheeled vehicles include inclination sensors in these vehicles, which sensors measure in particular the lateral inclination of the two-wheeled vehicle. These sensors are configured to have a maximum inclination threshold above which the vehicle is considered to be falling, triggering the engine to stop and thus making it possible to ensure the safety of the driver.

For example, if this threshold is 60° relative to a vertical direction defined by Earth's gravity, and the effective inclination angle of the vehicle is beyond 60°, the vehicle is considered to be falling and the engine is stopped.

This device also makes it possible to prevent the engine from starting if the vehicle is inclined beyond this threshold when the user starts it up.

First-generation mechanical inclination sensors are attached to the chassis of the vehicle. These sensors contain weights (for example, balls) which move according to the inclination of the vehicle and end up closing electrical contacts beyond a given inclination. The inertia of these weights thus determines the sensitivity of the sensor to the inclination of the vehicle and, furthermore, the precision of the angle measurement.

However, these sensors are bulky and involve significant constraints in terms of attachment to the chassis of the vehicle. For these reasons, a new generation of sensors is used, made up of an electronic control unit which contains a MEMS (Micro Electro Mechanical System) type accelerometer. This type of sensor is mounted directly near the engine.

However, there is a strong constraint on the positioning of the accelerometer. Specifically, during maintenance or repair, the sensor can be removed from the vehicle but it cannot be returned to its original calibration position. In this case, the inclination angle measured by the sensor no longer corresponds to the actual inclination of the vehicle.

In such a situation, the sensors may measure an inclination beyond the threshold while the vehicle is in an appropriate position, and thus trigger the engine to stop, this presenting significant risk of an accident if a user drives the vehicle.

Similarly, the sensor may also not detect a significant inclination and leave the engine running during a fall.

Physical poka-yoke systems can be installed on the various components to constrain the orientation of the sensor but they cannot fully ensure the systematic reproduction of the calibration position. These poka-yoke devices also do not make it possible to prevent the position of the components from changing as a result of wear of the parts and vibrations of the engine.

There is therefore a need for a simple and effective solution which makes it possible to at least partly overcome these drawbacks.

DISCLOSURE OF THE INVENTION

To this end, the invention first of all relates to a method of deactivating a cut-off function of an engine of an engine-driven two-wheeled vehicle, said vehicle comprising said engine, an electronic control unit and a speed measuring module, said speed measuring module being configured to measure a value of the speed of the vehicle, said electronic control unit comprising an inclination sensor configured to measure the lateral inclination of the vehicle and a memory zone comprising a first predetermined inclination threshold and a second predetermined inclination threshold, said first inclination threshold being less than the second inclination threshold, said electronic control unit being configured to compare the calculated inclination angle with the second predetermined inclination threshold and to implement the cut-off function of the engine by sending a stop signal to the engine if the calculated inclination angle is greater than the second predetermined inclination threshold, to receive the speed of the vehicle and trigger at least one time counter up to a predetermined value, said method comprising the steps of:

- activating the electronic control unit by an action of a user,
- receiving, by way of the electronic control unit, the speed of the vehicle measured by the speed measuring module,
- if the received speed is zero, calculating, by way of the electronic control unit, the inclination angle of the vehicle,
- if the calculated inclination angle is less than the first inclination threshold, the electronic control unit does not deactivate the cut-off function of the engine,
- if the calculated inclination angle is greater than the first threshold, the electronic control unit triggers a first time counter for a predefined time,
- calculating, by way of the electronic control unit, the inclination angle of the vehicle for as long as the first time counter has not reached the predefined time,
- if the calculated inclination angle is greater than the first threshold and less than the second threshold when the first time counter reaches the predefined time, the electronic control unit deactivates the cut-off function of the engine.

Lateral inclination is understood to mean the inclination of the plane in which the vehicle extends with respect to the plane formed by the ground. The action of a user may be the starting of the vehicle with a key for example.

The method according to the invention makes it possible to detect the difference between the inclination angle calculated by the electronic control unit of the vehicle when the latter is stationary and the expected inclination angle. When the calculated inclination angle is stable over time and less than the first inclination threshold, it is considered by the electronic control unit to be correct with respect to the expected position and the stop function of the engine of the vehicle is maintained. Conversely, if the calculated inclination angle is greater than the first threshold, all while remaining less than the second threshold so as not to trigger the stop function of the engine of the vehicle immediately, the calculation of the inclination angle is considered to be erroneous and may then cause the engine to stop for an acceptable inclination of the vehicle. In this case, the electronic control unit deactivates the stop function of the engine and sends a warning to the user who can then use the vehicle without the stop function of the engine while waiting to be able to repair the electronic control unit to calculate an inclination angle corresponding to the actual inclination of the vehicle.

Advantageously, if the inclination angle calculated after receiving a zero speed of the vehicle is greater than the second inclination threshold, the method comprises a step of triggering a second time counter for a second predefined time, a step of calculating the inclination angle of the vehicle for as long as the second time counter has not reached the second predefined time, a step of deactivating the cut-off function of the engine if the inclination angle calculated when the second time counter reaches the predefined time is equal to that calculated when the first time counter is triggered and a step of maintaining the cut-off function of the engine if the inclination angle calculated when the second time counter reaches the predefined time is different from that calculated when the first time counter is triggered. This option allows the electronic control unit to temporarily deactivate the stop function of the engine if the inclination angle calculated at standstill is greater than the second inclination threshold. Thus, if the calculation of the inclination angle is stable over time, an angle calculation error is detected and the stop function of the engine remains deactivated. On the other hand, if the calculation of the angle varies, this may signify a problem with the vehicle, for example that it falls at standstill or that it leaves the parking position. In this case, it is preferable from a safety point of view to reactivate the stop function of the engine.

Preferably, the inclination sensor is configured to determine the projection of Earth's gravity on three axes and the electronic control unit is configured to calculate the inclination angle from the three projections determined by the inclination sensor. This type of sensor corresponds to the MEMS type accelerometers used.

In one preferred embodiment, the electronic control unit is configured to receive the number of rotations per minute of the engine of the vehicle and the step of activating the electronic control unit is followed by a step of comparing, by way of the electronic control unit, the number of rotations per minute of the engine with a predefined value and a step of interrupting the method if the number of rotations per minute of the engine is greater than said predefined value. The electronic control unit may then trigger the checking of the calculation of the inclination angle when the engine is stopped or if the engine is idling, for example if the user has started the engine but no gear ratio is engaged.

Advantageously, the number of rotations per minute of the engine of the vehicle is calculated based on an electrical signal from a crank type sensor.

Preferably, the vehicle comprises a stabilizing stand and the electronic control unit is configured to detect the deployment of the stand, and the method comprises a step of checking for the deployment of the stand following the step of activating the electronic control unit and a step of interrupting the method if the deployment of the stand is not detected. The deployment of the lateral or central stand makes it possible to ensure that the vehicle is in a fixed stationary position and that the inclination angle is fixed.

In this embodiment, the first predetermined threshold advantageously corresponds to the addition of the inclination of the vehicle on ideally flat ground when the stabilizing stand is deployed and of a margin of error. The contribution of the inclination angle due to the stand varies depending on the nature and installation of the latter. The margin of error makes it possible to take into account, for example, the wear of the stand and irregularities in the ground which could cause small offsets with respect to the ideal inclination angle corresponding to the stand.

According to another aspect, the invention also relates to a computer program product, characterized in that it comprises a set of program code instructions, which, when executed by one or more processors, configure the one or more processors to implement a method as described.

According to another aspect, the invention also relates to an electronic control unit for an engine-driven two-wheeled vehicle, said electronic control unit comprising an inclination sensor configured to measure the lateral inclination of the vehicle and a memory zone comprising a first predetermined inclination threshold and a second inclination threshold, said electronic control unit being configured so as to be connected to the engine of said vehicle and to a speed measuring module, and so as to:

- receive a value of the speed of the vehicle measured by the speed measuring module,
- trigger at least one time counter up to a predetermined value,
- calculate a lateral inclination angle of the vehicle from the inclination measurements of the inclination sensor,
- compare a calculated inclination angle with the first inclination threshold and the second inclination threshold,
- send a command to stop the engine if the calculated inclination angle is greater than the second inclination threshold,
- deactivate the command to stop the engine if the calculated inclination angle is greater than the first inclination threshold.

Advantageously, the inclination sensor of the electronic control unit as described is configured to determine the projection of Earth's gravity on three axes and the electronic control unit is configured to calculate the inclination angle from the three projections determined by the inclination sensor.

According to another aspect, the invention also relates to an engine-driven two-wheeled vehicle comprising an electronic control unit as described.

DESCRIPTION OF THE DRAWINGS

Further features and advantages of the invention will become more clearly apparent from reading the following description. This description is purely illustrative and should be read with reference to the appended drawings, in which:

FIG. 1 schematically illustrates an engine-driven two-wheeled vehicle in which the method according to the invention is applied.

FIG. 2 schematically illustrates an electronic control unit implementing the method.

FIG. 3 schematically illustrates the lateral inclination of the vehicle with respect to the first and second inclination thresholds of the method according to the invention.

FIG. 4 schematically illustrates the sequence of the method according to the invention.

DESCRIPTION OF THE EMBODIMENTS

The method according to the invention is applied to an engine-driven two-wheeled vehicle 1.

Vehicle 1

As shown in FIG. 1, the vehicle 1 comprises an engine 10, an electronic control unit 11, a stand 12, a speed measuring module 13 and a communication link 14.

Engine 10

The engine 10 makes it possible to produce the torque required to drive the wheels of the vehicle 1 when the vehicle 1 is moving.

The engine 10 is connected to a mechanical gearbox, not shown in the figures, in order to change the gear ratio.

The engine 10 may be in operation without any ratio of the mechanical gearbox being engaged, for example when the vehicle 1 is started.

Electronic Control Unit 11

As shown in FIG. 2, the electronic control unit 11 comprises an inclination sensor 111 and a memory zone 112.

The inclination sensor 111 is preferably a MEMS type accelerometer, configured to calculate the projection of Earth's gravity on three axes of a coordinate system.

The electronic control unit 11 is configured to calculate the lateral inclination angle of the vehicle 1 with respect to Earth's vertical from the three projections measured by the inclination sensor 111.

The memory zone 112 is configured to store information. In particular, the memory zone 112 comprises two angles θ1 and θ2, corresponding to a first inclination threshold and a second inclination threshold, as shown in FIG. 3.

The electronic control unit 11 is configured to compare the calculated inclination angle θ with the first inclination threshold θ1 and the second inclination threshold θ2.

The first inclination threshold θ1 corresponds to the expected inclination angle of the vehicle 1 when it rests on the deployed stand 12, a margin of error of a few degrees being added to said expected inclination angle. The margin of error makes it possible to take into account variations in inclination due, for example, to irregularities in the ground or to a change in the stand 12.

The second inclination threshold θ2 corresponds to the angle from which the electronic control unit 11 considers the vehicle 1 to be falling.

The electronic control unit 11 is configured to implement a stop function of the engine 10 of the vehicle 1 if the calculated lateral inclination angle θ is greater than the second inclination threshold θ2.

Stand 12

The stand 12 allows the vehicle 1 to have an additional point of support to hold it in a stable position once deployed.

The stand 12 is configured to send signals to the electronic control unit 11 via the communication link 14 indicating whether or not the stand 12 is deployed.

In the example shown in the figures, the stand 12 is a lateral stand. When it is deployed, the stationary vehicle 1 rests on it and has an inclination relative to Earth's vertical Z, as shown in FIG. 3.

In another embodiment, the stand 12 may be a central stand. When it is deployed, the stationary vehicle 1 rests on it and remains upright relative to Earth's vertical Z.

Speed Measuring Module 13

The speed measuring module 13 is configured to measure the speed of travel of the vehicle 1.

The speed measuring module 13 may be of various types, such as, for example, a rotation counter on one of the wheels of the vehicle 1.

Communication Link 14

The communication link 14 allows communication between the electronic control unit 11 and the engine 10, the stand 12 and the speed measuring module 13.

Preferably, the communication link 14 is a wired communication link, for example of CAN type.

Exemplary Embodiment

The method according to the invention is implemented when a user of the vehicle 1 activates the vehicle 1.

The activation of the vehicle 1 consists, for example, in turning the key of the vehicle 1 or in pressing a start button.

As a result of the activation of the vehicle 1 by the user, the electronic control unit 11 is activated in a step E1.

Following the step of activating the electronic control unit 11, the electronic control unit 11 receives, via the communication link 14, a value of the speed of the vehicle 1 measured by the speed measuring module 13 in a step E2.

In a step E3, the electronic control unit 11 checks that the value of the received speed is zero. If the speed is non-zero, the electronic control unit 11 detects that the vehicle 1 is moving and interrupts the method and the cut-off function of the engine 10 on the basis of the lateral inclination of a vehicle 1 is maintained.

Following the step of activating the electronic control unit 11, the electronic control unit 11 receives, via the communication link 14, a value of the number of rotations per minute of the engine 10 in a step E2*.

In a step E3*, the electronic control unit 11 checks that the number of rotations per minute of the engine 10 is less than a predetermined value. If it is greater, the electronic control unit 11 detects that the vehicle 1 is moving and interrupts the method and the cut-off function of the engine 10 on the basis of the lateral inclination of the vehicle 1 is maintained.

Following the step of activating the electronic control unit 11, the electronic control unit 11 receives, via the communication link 14, a signal of deployment of the stand 12 indicating whether or not the stand 12 is deployed in a step E2**.

In a step E3, the electronic control unit 11 checks that the stand 12 is deployed. If it is not deployed, the electronic control unit 11 detects that the vehicle 1 is not in equilibrium and interrupts the method and the cut-off function of the engine 10 on the basis of the lateral inclination of the vehicle 1** is maintained.

The zero speed of the vehicle 1, the number of rotations per minute of the engine 10 and the deployment of the stand 12 form the control conditions required for the method according to the invention.

Steps E2, E2* and E2** may be performed simultaneously or in any order.

Steps E3, E3* and E3** may be performed simultaneously or in any order.

In a step E4, the electronic control unit 11 calculates the inclination angle θ of the vehicle 1 from the projection of Earth's gravity on three axes of the coordinate system of the inclination sensor.

In a step E5, the electronic control unit 11 compares the value of the calculated inclination angle θ with the first inclination threshold θ1 and the second inclination threshold θ2.

If the value of the inclination angle θ is less than the first inclination threshold θ1, the vehicle 1 is in an inclination consistent with the configuration resting on the stand 12. The vehicle 1 may also be upright if it is on a central stand 12 or if the user is sitting on it. In a step E6, the electronic control unit 11 does not trigger the cut-off function of the engine 10 on the basis of the lateral inclination and repeats the method from step E1.

Thus, the method is repeated until the user starts the vehicle 1, in which case the control conditions will no longer be checked and the method will be interrupted without deactivating the stop function of the engine 10.

If the value of the inclination angle θ is greater than the first inclination threshold θ1 and less than the second inclination threshold θ2, the electronic control unit 11 triggers, in a step E6*, a first time counter for a predefined time.

In a step E7*, the electronic control unit 11 calculates the inclination angle θ of the vehicle 1 iteratively and compares each calculation with the previous one.

If, when the first time counter reaches the predefined time, the electronic control unit 11 calculates an inclination angle θ equal to (or sufficiently close to) the inclination angle calculated in step E4 and therefore less than the second inclination threshold θ2, the electronic control unit 11 triggers, in a step E8*, the interruption of the cut-off function of the engine 10 on the basis of the lateral inclination of the vehicle 1.

Specifically, the calculation of an inclination angle θ greater than the first inclination threshold θ1 under the control conditions of the vehicle 1 indicates that there is an error in the calculation of the angle by the electronic control unit 11. The cut-off function of the engine 10 on the basis of the lateral inclination of the vehicle 1 must then be interrupted so as to prevent the engine 10 from being stopped when the vehicle 1 is moving, and the user is warned of the calculation error in a step E9*.

If, when the first time counter reaches the predefined time, the electronic control unit 11 calculates an inclination angle θ which varies beyond a margin of error with respect to the inclination angle θ calculated in step E4, the electronic control unit 11 triggers the reinitialization of the method from step E1 since the variation in the inclination angle θ may show that the vehicle 1 is moving all while respecting the conditions of steps E2, E2* and E2**, this possibly corresponding to a fall at standstill, for example.

If the value of the inclination angle θ is greater than the first inclination threshold θ1 and greater than the second inclination threshold θ2, the electronic control unit 11 triggers, in a step E6**, a second time counter for a second predefined time.

In a step E7, the electronic control unit 11 calculates the inclination angle θ of the vehicle 1** iteratively and compares each calculation with the previous one.

If, when the second time counter reaches the predefined time, the electronic control unit 11 calculates an inclination angle θ equal to (or sufficiently close to) the inclination angle θ calculated in step E4, the electronic control unit 11 triggers, in a step E8, the interruption of the cut-off function of the engine 10 on the basis of the lateral inclination of the vehicle 1**.

Specifically, the calculation of an inclination angle θ constant for a predetermined time and greater than the second threshold under the control conditions of the vehicle 1 indicates that there is an error in the calculation of the angle by the electronic control unit 11. The cut-off function of the engine 10 on the basis of the lateral inclination of the vehicle 1 must then be interrupted so as to prevent the engine 10 from being stopped when the vehicle 1 is moving, and the user is warned of the error in a step E9**.

If, when the second time counter reaches the predefined time, the electronic control unit 11 calculates an inclination angle θ which varies beyond a margin of error with respect to the inclination angle θ calculated in step E4, the electronic control unit 11 triggers the reinitialization of the method from step E1 since the variation in the inclination angle θ may show that the vehicle 1 is moving all while respecting the conditions of steps E2, E2* and E2**, this possibly corresponding to a fall at standstill, for example.

Since the calculated inclination angle θ of the vehicle 1 is greater than the second inclination threshold θ2, the electronic control unit 11 is configured to activate the stop function of the engine 10. For this, the inclination angle θ must be confirmed over a certain time. However, in the case of a problem in inclination measurement, it is desirable for this function not to be activated if the engine 10 of the stationary vehicle 1 is operating at low speed.

The second predefined time is therefore less than the latency time of the stop function of the engine 10. Once the second predefined time has been reached by the second time counter, the electronic control unit 11 can therefore determine that there is an inclination problem if the inclination angle θ is constant, or if there is a problem with the stability of the vehicle 1 if this inclination angle θ varies.

In this case, it is preferable to leave the stop function of the engine 10 activated on the basis of the inclination angle θ. This case may occur if the stationary vehicle 1 is falling.

The invention claimed is:

1. A method of deactivating a cut-off function of an engine (10) of an engine-driven two-wheeled vehicle (1), said vehicle (1) comprising said engine (10), an electronic control unit (11) and a speed measuring module (14), said electronic control unit (11) comprising an inclination sensor (111) and a memory zone (112), the electronic control unit (11) being configured to calculate the lateral inclination angle (θ) of the vehicle (1) from the measurements carried out by the inclination sensor (111), said memory zone (112) comprising a first predetermined inclination threshold (θ1) and a second predetermined inclination threshold (θ2), said first inclination threshold (θ1) being less than the second inclination threshold (θ2), said electronic control unit (11) being configured to compare the calculated inclination angle (θ) with the second inclination threshold (θ2) and to implement the cut-off function of the engine by sending a stop signal to the engine if the calculated inclination angle (θ) is greater than the second predetermined inclination threshold (θ2), to receive the speed of the vehicle (1) and trigger at least one time counter up to a predetermined value, said method comprising the steps of:

activating (E1) the electronic control unit (11) by an action of a user, receiving (E2), by way of the electronic control unit (11), the speed of the vehicle (1), if the received speed is zero, calculating (E4), by way of the electronic control unit (11), the inclination angle (θ) of the vehicle (1), if the calculated inclination angle (θ) is less than the first inclination threshold (θ1), the electronic control unit (11) does not deactivate the cut-off function of the engine (10), if the calculated inclination angle (θ) is greater than the first inclination threshold (θ1), the electronic control unit (11) triggers (E6*) a first time counter for a predefined time, calculating (E7*), by way of the electronic control unit (11), the inclination angle (θ) of the vehicle (1) for as long as the first time counter has not reached the predefined time, if the calculated inclination angle (θ) is greater than the first inclination threshold (θ1) and less than the second inclination threshold (θ2) when the first time counter reaches the predefined time, the electronic control unit (11) deactivates (E8*) the cut-off function of the engine (10).

2. The method as claimed in claim 1, wherein, if the inclination angle (θ) calculated after receiving a zero speed of the vehicle (1) is greater than the second inclination threshold (θ2), the method comprises a step of triggering a second time counter (E6) for a second predefined time, said second predefined time being shorter than the first predefined time, a step of calculating (E7**) the inclination angle (θ) of the vehicle (1) for as long as the second time counter has not reached the second predefined time, a step of deactivating (E8**) the cut-off function of the engine (10) if the inclination angle (θ) calculated when the second time counter reaches the predefined time is equal to that calculated when the first time counter is triggered and a step of maintaining the cut-off function of the engine 10** if the inclination angle (θ) calculated when the second time counter reaches the predefined time is different from that calculated when the first time counter is triggered.

3. The method as claimed in claim 1, wherein the inclination sensor (111) is configured to determine the projection of Earth's gravity on three axes of a coordinate system and the electronic control unit (11) is configured to calculate the inclination angle (θ) from the three projections determined by the inclination sensor (111).

4. The method as claimed in claim 1, wherein the electronic control unit (11) is configured to receive the number of rotations per minute of the engine (10) of the vehicle (1) and wherein the step of activating the electronic control unit (11) is followed by a step of comparing (E3*), by way of the electronic control unit (11), the number of rotations per minute of the engine (10) with a predefined value and a step of interrupting the method if the number of rotations per minute of the engine (10) is greater than said predefined value.

5. The method as claimed in claim 1, wherein the vehicle (1) comprises a stabilizing stand (12) and the electronic control unit (11) is configured to detect the deployment of said stand (12), said method comprising a step of checking (E3) for the deployment of the stand (12) following the step of activating the electronic control unit (11) and a step of interrupting the method if the deployment of the stand (12**) is not detected.

6. The method as claimed in claim 5, wherein the first inclination threshold (θ1) corresponds to the addition of the inclination of the vehicle (1) on ideally flat ground when the stand (12) is deployed and of a margin of error.

7. A computer program product, characterized in that it comprises a set of program code instructions, which, when executed by one or more processors, configure the one or more processors to implement a method as claimed in claim 1.

8. An electronic control unit (11) for an engine-driven two-wheeled vehicle (1), said electronic control unit (11) comprising an inclination sensor (111) configured to measure the lateral inclination angle (θ) of the vehicle (1) and a memory zone (112) comprising a first predetermined inclination threshold (θ1) and a second inclination threshold (θ2), said electronic control unit (11) being configured so as to be connected to the engine (10) of said vehicle (1) and to a speed measuring module (14), and so as to:

receive a value of the speed of the vehicle (1) measured by the speed measuring module (14), trigger at least one time counter up to a predetermined value, compare a calculated inclination angle (θ) with the first inclination threshold (θ1) and the second inclination threshold (θ2), send a command to stop the engine if the calculated inclination angle (θ) is greater than the second inclination threshold (θ2), deactivate the command to stop the engine (10) if the calculated inclination angle (θ) is greater than the first inclination threshold (θ1).

9. The electronic control unit (11) as claimed in claim 8, wherein the inclination sensor (111) is configured to determine the projection of Earth's gravity on three axes and the electronic control unit (11) is configured to calculate the inclination angle (θ) of the vehicle (1) from the three projections determined by the inclination sensor (111).

10. An engine-driven two-wheeled vehicle (1) comprising an electronic control unit (11) as claimed in claim 8.

* * * * *